United States Patent
Baeuerle et al.

(10) Patent No.: US 6,779,388 B2
(45) Date of Patent: Aug. 24, 2004

(54) METHOD FOR PERFORMING A FUNCTIONAL DIAGNOSIS ON A VENTILATION SYSTEM OF A CRANKCASE OF AN INTERNAL COMBUSTION ENGINE

(75) Inventors: Michael Baeuerle, Markgroeningen (DE); Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 487 days.

(21) Appl. No.: 09/864,065

(22) Filed: May 23, 2001

(65) Prior Publication Data

US 2001/0047801 A1 Dec. 6, 2001

(30) Foreign Application Priority Data

May 27, 2000 (DE) .......................................... 100 26 492

(51) Int. Cl.[7] .............................................. G01M 19/00
(52) U.S. Cl. ...................................................... 73/118.1
(58) Field of Search ............................ 73/117.3, 118.1, 73/116; 123/572, 574; 701/29

(56) References Cited

U.S. PATENT DOCUMENTS 3,673,994 A 7/1972 Aono
3,754,538 A 8/1973 Ephraim, Jr. et al.
5,697,349 A 12/1997 Blum

FOREIGN PATENT DOCUMENTS

| JP | 04 237811 | 8/1992 |
| JP | 2723402 | 2/1996 |

*Primary Examiner*—Edward Lefkowitz
*Assistant Examiner*—Maurice Stevens
(74) *Attorney, Agent, or Firm*—Kenyon & Kenyon

(57) ABSTRACT

In a method for performing a functional diagnosis on a ventilation system of a crankcase of an internal combustion engine, a pulse valve is situated in a vent line. The pulse valve is controlled as a function of the pressure in the crankcase, the pressure being determined by a pressure sensor. In response to a high pressure, the pulse valve is opened to allow the vapors to be discharged via an intake pipe. In this context, the pulse valve is controlled as a function of operating requirements, exhaust gas requirements, and/or load conditions. Based on the pressure characteristic, it can be detected, for example, whether the oil level is sufficient, whether there is a leak in the closed ventilation system, or whether the internal combustion engine exhibits increased wear. As a result of an optimized operating method, blowby gases can be reduced, as well as emissions, and friction losses in the crankcase.

11 Claims, 2 Drawing Sheets

METHOD FOR PERFORMING A FUNCTIONAL DIAGNOSIS ON A VENTILATION SYSTEM OF A CRANKCASE OF AN INTERNAL COMBUSTION ENGINE

BACKGROUND INFORMATION

In the operation of internal combustion engines, gaps in the piston ring cause leakage flows from the combustion chamber into the crankcase. These are the so-called blowby losses. As a result, the pressure in the crankcase is increased by the engine oil and oil gases. To prevent the pressure in the crankcase from becoming too great, the blowby gases must be removed from the crankcase. Present-day internal combustion engines use closed ventilation systems. The blowby gases are fed to the intake tract and return again to the combustion chamber. However, it is disadvantageous that the blowby gases lead to contamination of the combustion mixture, thereby negatively affecting combustion.

Ventilation is typically carried out in a closed system, by the vacuum in the intake pipe. Due to stricter exhaust emission regulations, attempts are also underway to produce a certain overpressure in the crankcase using a valve in the vent line, and to first purge the vapors in the presence of a stable (fixed) overpressure.

Legal reasons make it unacceptable to vent the crankcase into the environment. The resulting difficulty is that one must be able to reliably detect leaks, as can occur due to damaged vent lines, for example. To date, this diagnosis has been made indirectly by performing a threshold value comparison on the values of the mixture adaptation. However, in order for the mixture adaptation to respond, the hose diameter must be selected to be wide enough to draw in a corresponding amount of blowby. However, this kind of diagnosis, in turn, limits the design of the crankcase ventilation system.

SUMMARY OF THE INVENTION

The method according to the present invention has the advantage that an exact diagnosis of the crankcase ventilation system is possible, without having to accept structural restrictions. It is particularly advantageous that, on the one hand, the blowby gases and, as such, the engine emissions are reduced as a result of an optimized operating method. On the other hand, friction losses in the crankcase are also reduced, thereby potentially also resulting in advantages with respect to consumption.

It is considered particularly advantageous that the pulse valve is closed for a predefined time span during the pressure build-up phase. In this phase, the pressure change can be determined, and the system can be simultaneously checked for potential leaks.

Adjusting the closing time of the pulse valve as a function of important operating parameters of the internal combustion engine results in an advantageous possibility to optimally control the siphoning of the oil vapors. Thus, in response to a greater engine load, for example, the timing for the pulse valve can be extended, without the combustion process being significantly disrupted.

Ventilation can also be optimized in the case of different operating modes, in particular, stratified operation or homogenous operation.

Since cycle times for the pulse valve can become very short in the event of a high rotational frequency, it is advisable to first open the valve at a preselected pressure. As a result, the flow of the vapors into the intake tract can be controlled, and, thus, ventilation is adapted to the load condition of the engine.

If the engine loses a larger quantity of oil, this also has an effect on the pressure in the crankcase. Checking the pressure characteristic results in a simple method for monitoring the oil level in the crankcase. Advantageously it is, therefore, no longer necessary to use an oil-level sensor.

Furthermore, it is considered advantageous to use conventional pressure sensors for measuring the ambient pressure. Such a sensor is used for fuel tank ventilation, for example.

Advantageously, to comply with environmental demands and to detect potential leaks early, a statement regarding the seal tightness of the ventilation system is made possible by monitoring the pressure characteristic.

Using the pressure signal of the pressure sensor can also be advantageously applied for other control functions. For example, according to oil type, age, and temperature, oil sludge, which can block the line, can be deposited, especially in the vent line, To prevent these deposits or to remove them again, an electrically operated heater is used in some engine systems. This heater is advantageously switched on as needed when there is a pressure signal in the crankcase. If, for example, at cold temperatures, it is detected that there is an increase in pressure in the crankcase, the heater is switched on. However, if there is no increase in pressure, the heater does not need to be switched on, since there is no blockage in the vent line.

Furthermore, it is advantageous to consider the characteristic curve of the pressure signal in assessing engine wear. Particularly in the case of older engines, there is an increase in blowby losses due to the increased clearance between the piston rings and cylinder wall. This then leads to increased pressure in the crankcase with respect to an intact engine. By comparing the measured values to stored threshold values, the state of the engine can be deduced.

DETAILED DESCRIPTION

Figure 1:
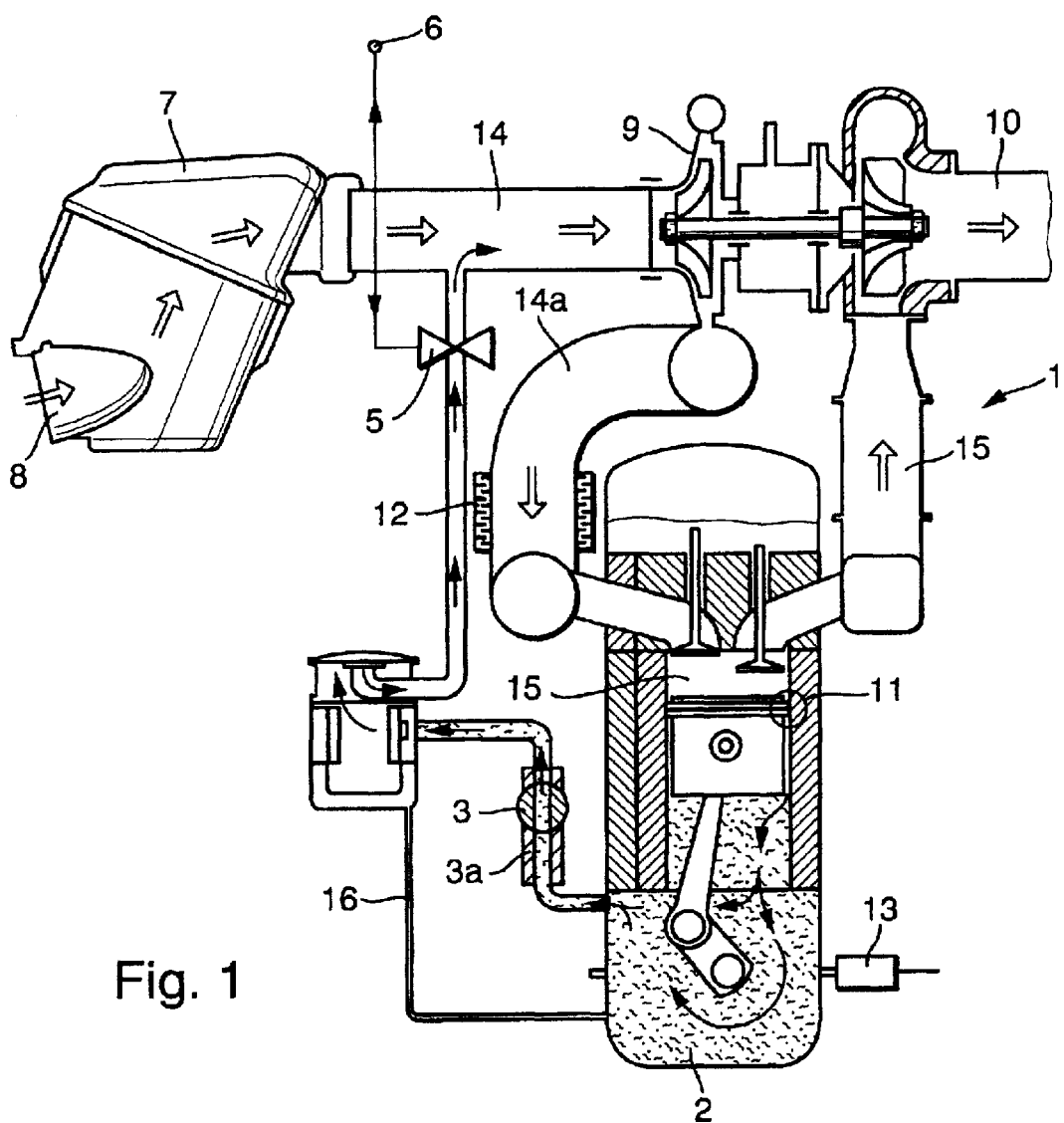
FIG. 1 shows a block diagram of an internal combustion engine including a ventilation cycle.

The schematic representation of FIG. 1 shows an internal combustion engine 1, whose design includes a turbo-charger 9, for example. Intake air 8 is forced using overpressure into a combustion chamber 15 of internal combustion engine 1 via an air filter 7, an intake pipe 14, and the pump impeller of turbo-charger 9. A charge-air cooler 12 can be attached to intake elbow 14a. After combustion, exhaust gas 15 is expelled via an exhaust valve, as shown in the drawing. In this context, exhaust gas 15 propels a turbine blade of turbo-charger 9 and is then ultimately released into the environment via an exhaust pipe 10 and an exhaust system (not shown). As a result of piston ring gaps 11 between the piston seals (piston rings) and the cylinder wall of internal combustion engine 1, more or less air and exhaust gas (blowby gases) penetrate along the cylinder wall into a crankcase 2, in which the lubricating oil for the engine is also located, during compression or the expansion stroke. A vent line 3, which is linked via an oil separator 4 to intake pipe 14, is connected at a suitable location of crankcase 2. A pulse valve 5, via which the outlet of the oil-containing vapors from crankcase 2 into intake pipe 14 can be electrically controlled, is situated at a suitable location of vent line 3. For this purpose, a gate 6 is provided that can be connected to a control unit (not shown). The control unit then receives its information from a pressure sensor 13, which is attached in the region of the crankcase and determines there the pressure and/or the pressure characteristic as a function of time. For the sake of completeness, it must also be mentioned that oil separator 4 has an oil return line 16, so that the separated oil can flow back into crankcase 2. A heater 3a can also be provided on vent line 3 to free the line of blockage due to oil deposits.

Figure 2:
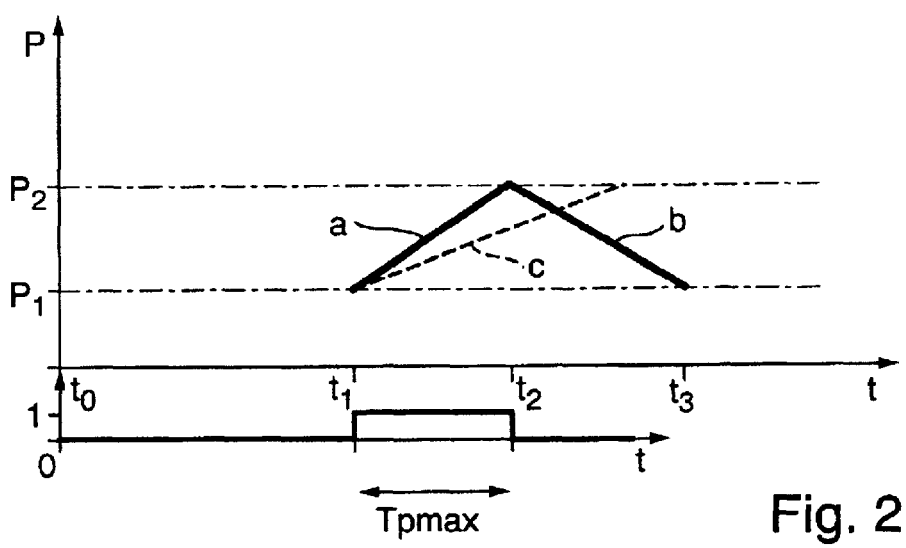
FIG. 2 shows a flow chart.
Figure 3:
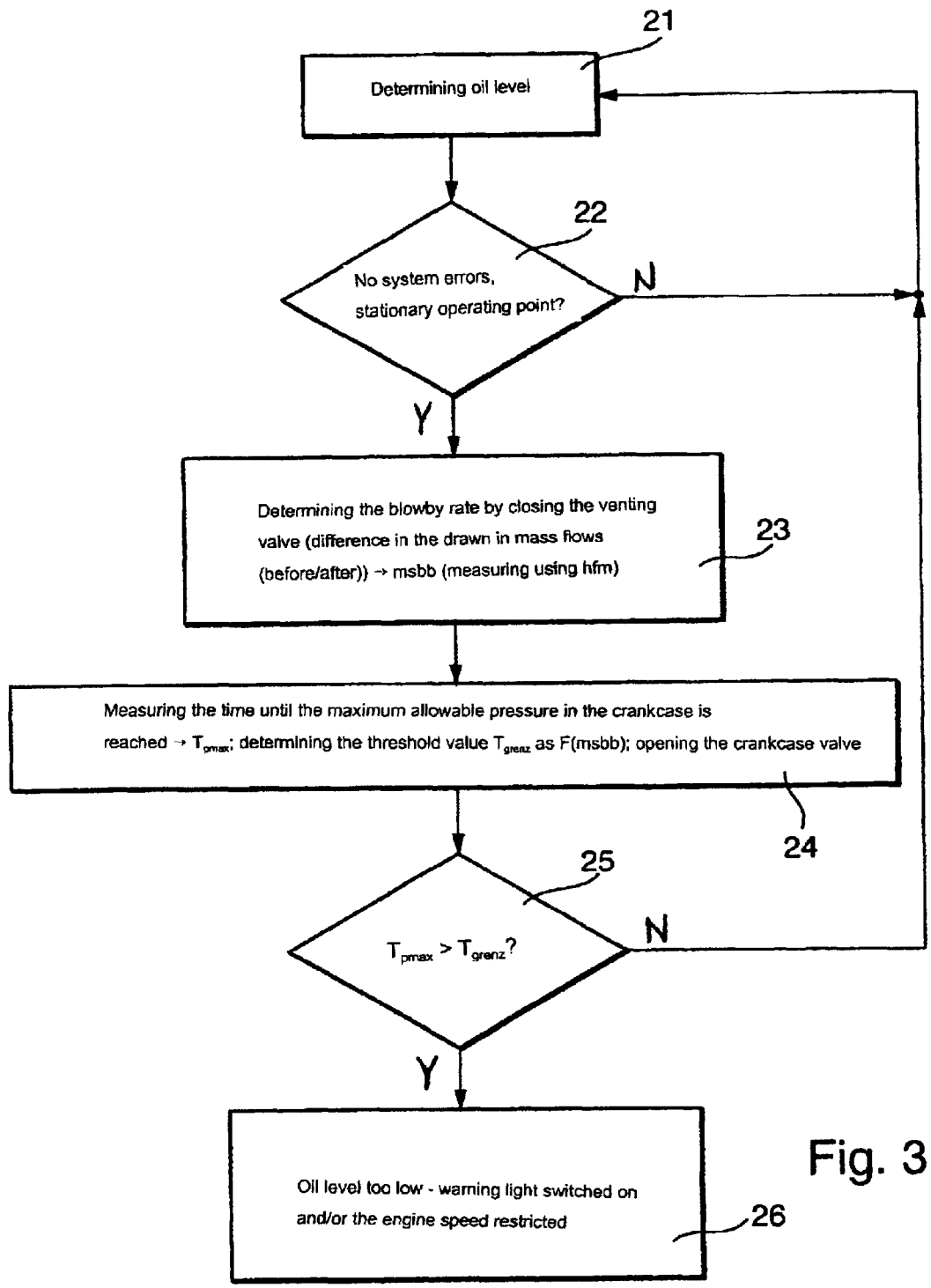
FIG. 3 shows two diagrams.

The functioning method of this system is described in more detail based on FIGS. 2 and 3. During normal operation, i.e., when the oil pressure in crankcase 2 is under a first threshold P1 (FIG. 2), pulse valve 5 is open, i.e., the exhaust-gas connection from crankcase 2 to intake pipe 14 is permeable. As can be inferred from the diagram in FIG. 2, this is the case between times t0 and t1 or >t3. If according to the bottom curve pulse valve 5 is closed at time t1 via gate 6 as the result of a control command, pressure builds more or less quickly, as can be seen in characteristic curve a or c. The pressure increases until a maximum pressure P2 is reached at time t2. Pulse valve 5 is then opened, so that the vapors can flow into intake pipe 14 since they are entrained as a result of the high speed of intake air 8. Consequently, the pressure in crankcase 2 reduces more or less quickly, as can be deduced from characteristic curve b. At time t3, the pressure value is at first threshold P1. Second threshold value P2 can be preset in a fixed manner, e.g. between 50 and 150 mbar. Alternatively, pressure threshold P2 can also be preset as a function of operating and environmental conditions. In particular, the different operating parameters, such as oil level, temperature, engine speed, load condition, operating modes, such as lean-burn operation and stratified operation and the like, can be taken into consideration for changing the closing times for pulse valve 5. To clarify the bottom diagram of FIG. 2, it must also be mentioned that pulse valve 5 is closed at position 1 and open at 0. A number of pieces of information that can be used for an exact diagnosis of the crankcase ventilation system can be inferred from the characteristic curve of pressure curves a, b, c. For example, the seal tightness of the crankcase can be checked during time span t1 to t2 ($T_{pmax}$). If pulse valve 5 is closed, there must be an increase in pressure in the crankcase within a specific time period dependent on the operating point, due to the blowby gases. The crankcase ventilation system is untight if this expected pressure increase does not occur or occurs too slowly, as shown, for example, in curve c.

For optimized ventilation via pulse valve 5, the flow of the oil vapors is controlled in intake pipe 14. In this context, pulse valve 5 can be controlled in such a manner that the ventilation system is adapted to the load condition of the engine. In response to a large load, ventilation can be increased without negatively affecting combustion, for example. Especially in the case of gasoline direct injection systems, where one strives for operating-mode dependent control for stratified operation and homogeneous operation, the control of pulse valve 5 can be adapted accordingly.

Alternatively, to achieve lower emissions from the crankcase, a constant overpressure of 50 to 150 mbar, for example, can be set.

In FIG. 3, a flow chart is shown by which the oil level can be determined. For this purpose, the pressure characteristic is measured according to position 21 and compared to preselected, stored values or curves. For example, curve a (FIG. 2) shows a normal oil level, while the dotted, flatter curve c shows an oil level that is too low. In tests, it was namely determined that the loss of a larger amount of oil has a direct effect on the pressure in crankcase 2. For example, an oil loss of approximately 1 liter causes a change in pressure of about 25 mbar. By comparing the pressure signal, such as to threshold values dependent on the operating point and the flow through the valve, an oil loss can be diagnosed.

According to this scheme, a check is first performed at position 22 to determine whether there are any system errors and whether there is a stationary operating point for internal combustion engine 1. If this is not the case, the program returns to position 21 and begins the oil level query anew. However, if internal combustion engine 1 is at a stationary operating point, the blowby rate is determined at position 23 by temporarily closing pulse valve 5 and subtracting the drawn in mass flows before and after closing the valve. After closing pulse valve 5 at time t1, the time is then measured at position 24 until the maximum allowable pressure P2 is reached in crankcase 2. This time is compared to a predefined threshold value $T_{pmax}$. Based on the present data, a threshold value for a maximum limit time $T_{grenz}$ is determined as a function of the mass flows. At position 25, a check is performed to determine whether limit time $T_{grenz}$ is smaller than maximum value $T_{pmax}$. If this is not the case, the program returns to position 21. In another case, it is diagnosed at position 26 that the oil level is too low. Consequently, a warning light in the dashboard is switched on, and the engine speed, for example, of internal combustion engine 1 is restricted to prevent engine damage. The characteristic of the curves in FIG. 2 can also be used to optimize the control of the heater. As was already explained, vent line 3 can be electrically heated to prevent blockage at lower temperatures. In this context, heater 3a is switched on below a temperature threshold. If, for example, there is a pressure signal in the crankcase, heater 3a can first be activated as necessary. This is the case when a pressure increase occurs in crankcase 2 at cold temperatures. If there is no increase in pressure, it is not necessary to activate heater 3a since no blockage can be expected in vent line 3. Furthermore, the state of the engine can be deduced from the characteristic of the pressure curve. This is particularly advantageous for older engines, as previously explained.

What is claimed is:

1. A method for performing a functional diagnosis on a ventilation system of a crankcase of an internal combustion engine, the ventilation system including a valve in a vent line for releasing vapors into an intake pipe of the engine, the method comprising:

opening the valve to release vapors into the intake pipe of the engine in response to a predefined pressure threshold being reached, the vapors being fed together with intake air to a combustion chamber of the engine;

determining at least one of an oil pressure and a change in pressure in the crankcase using a pressure sensor and providing a signal indicative thereof; and closing the valve a function of the signal of the pressure sensor for a predefined time period, the valve being an electrically controllable pulse valve.

2. The method according to claim 1, further comprising:

changing a closing time of the pulse valve as a function of at least one operating parameter, the at least one operating parameter including at least one of an oil level, a temperature, an engine speed, a load, at least one environmental parameter, an operating time, and an engine type.

3. The method according to claim 2, further comprising:

controlling the pulse valve as a function of the load and the engine speed of the engine; and extending a ventilation phase in response to one of a high engine speed and a small load.

4. The method according to claim 2, further comprising:

determining a value for the oil level in the crankcase with a predefined time span, from a characteristic curve of a pressure measured by the pressure sensor.

5. The method according to claim 1, further comprising:

controlling the pulse valve as a function of an operating mode, in the case of one of a stratified operation and a homogenous operation.

6. The method according to claim 1, further comprising:

controlling the pulse valve such that predefined pressure values are maintained in the crankcase.

7. The method according to claim 6, wherein the predefined pressure values are 50 to 150 mbar.

8. The method according to claim 1, further comprising:

deducing a seal tightness of the ventilation system within a predefined time span, from the change in pressure measured by the pressure sensor.

9. The method according to claim 1, further comprising:

controlling a heater for the vent line as a function of the signal of the pressure sensor.

10. The method according to claim 1, further comprising:

assessing engine wear as a function of the signal of the pressure sensor.

11. The method according to claim 1, wherein the method is used for an internal combustion engine having a turbocharger.

* * * * *

UNITED STATES PATENT AND TRADEMARK OFFICE
CERTIFICATE OF CORRECTION

PATENT NO.    : 6,779,388 B2
DATED         : August 24, 2004
INVENTOR(S)   : Michael Baeuerle et al.

It is certified that error appears in the above-identified patent and that said Letters Patent is hereby corrected as shown below:

<u>Column 4,</u>
Line 58, change "closing the valve a function" to -- closing the valve as a function --.

Signed and Sealed this

Sixteenth Day of August, 2005

JON W. DUDAS
*Director of the United States Patent and Trademark Office*